May 2, 1967  W. E. FUNK ETAL  3,317,088
FERTILIZER APPLICATOR

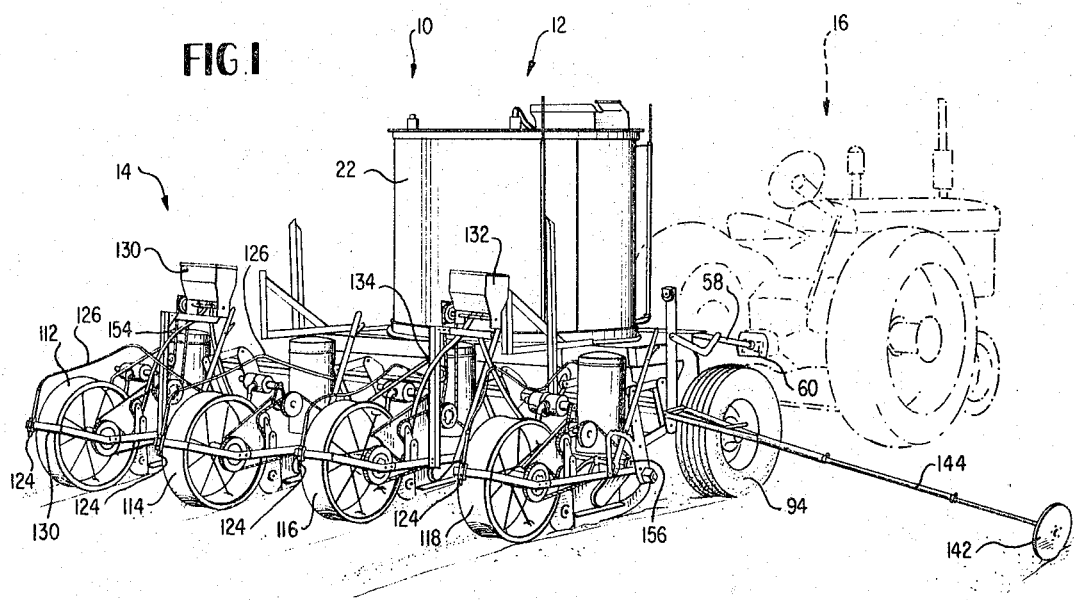

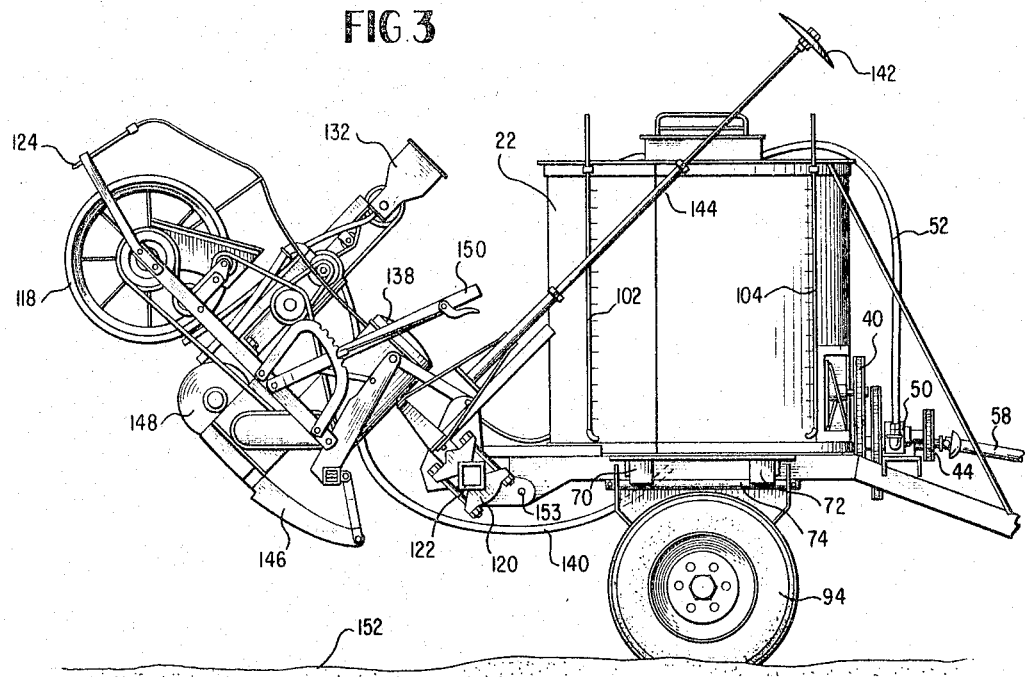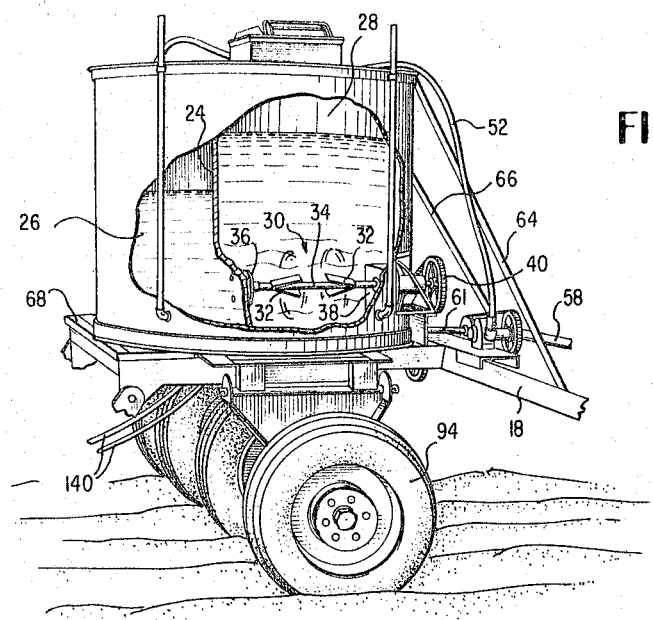

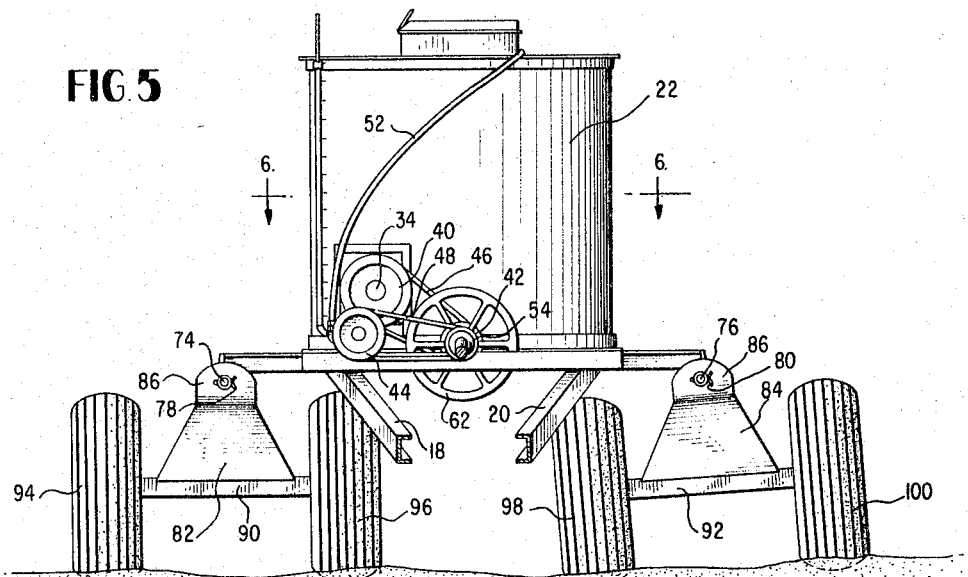
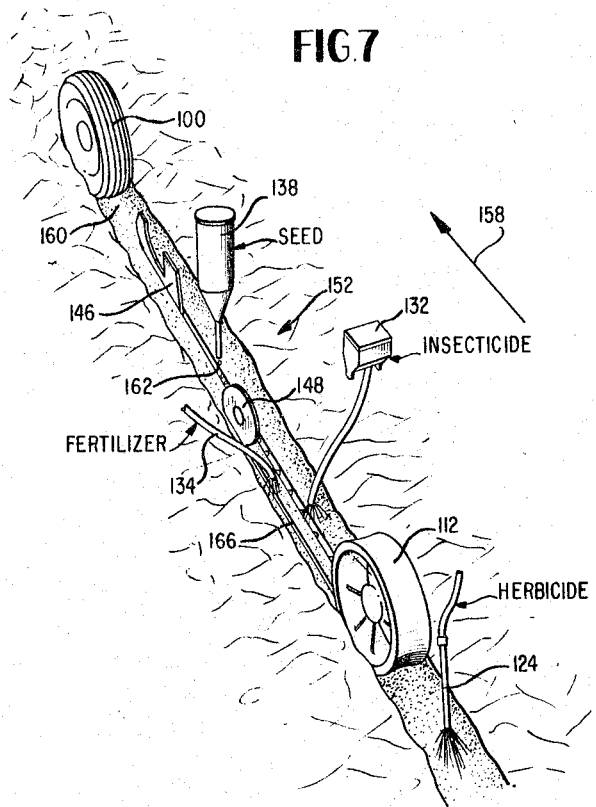
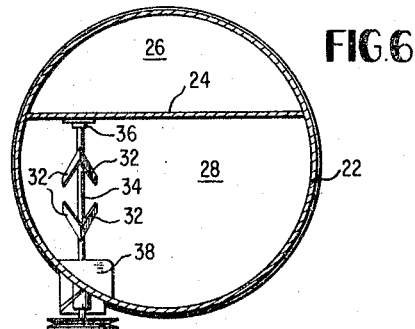
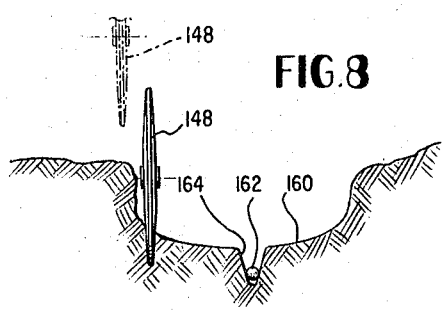

Filed June 1, 1964  5 Sheets-Sheet 4

INVENTORS
WILLIAM E. FUNK
IRVIN H. LEHMAN
LeBlanc & Shur
ATTORNEYS

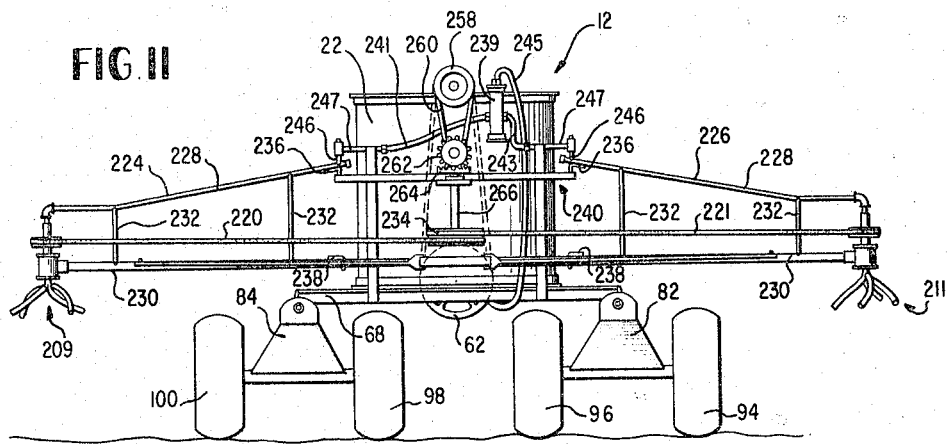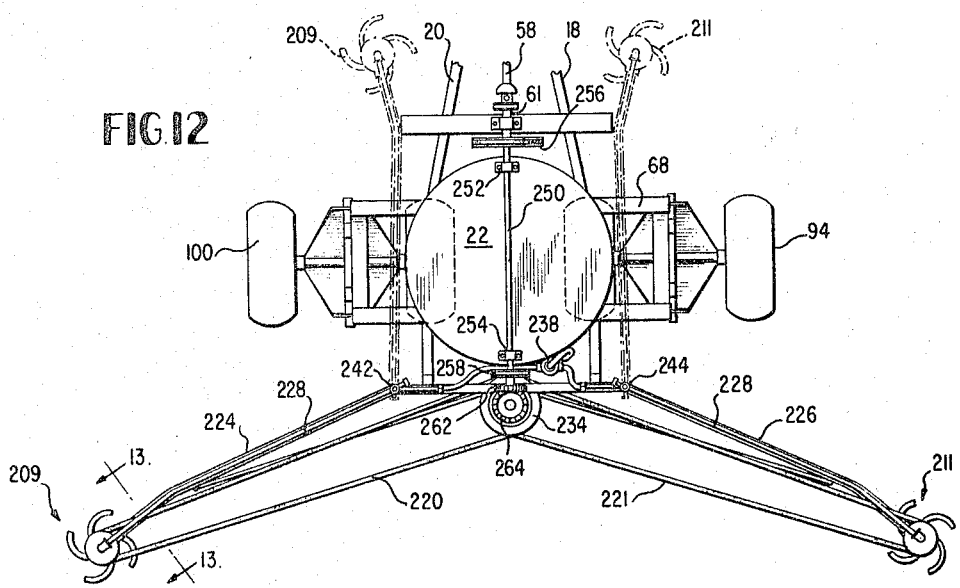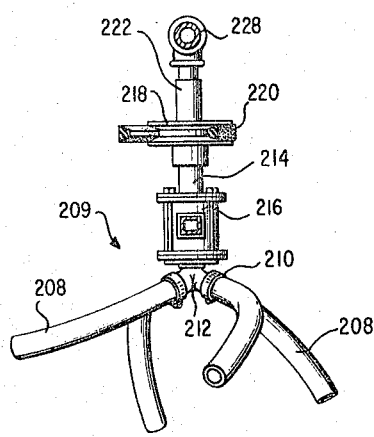

3,317,088
FERTILIZER APPLICATOR
William E. Funk and Irvin H. Lehman, both of Kentland, Ind., assignors to Edw. J. Funk & Sons Inc., Kentland, Ind., a corporation of Indiana
Filed June 1, 1964, Ser. No. 371,398
7 Claims. (Cl. 222—178)

This invention relates to apparatus for supplying crop nutrients to the soil and more particularly to an applicator for applying slurry fertilizers to commercial crops such as corn and the like.

Fertilizers are conventionally listed according to the quantities of the three principal plant foods, namely, nitrogen, phosphorus and potassium they contain. These quantities are usually given in terms of pure nitrogen, and as oxides of phosphorus ($P_2O_5$), and potassium ($K_2O$). Fertilizers containing all three of these ingredients are sometimes referred to as complete fertilizers and in addition may include trace elements such as zinc, boron, manganese and sulphur.

More recently, slurry or suspension type fertilizers have been developed which combine the best features of the earlier solid and liquid fertilizers. The slurries may contain large quantities of all three of the principal crop nutrients in the manner of dry fertilizers but at the same time retain the advantages in terms of ease of handling heretofore possessed only by the liquid fertilizers.

According to the present invention it has been found possible to provide for the efficient and economical application of slurry fertilizers through the use of a basic multi-purpose applicator or slurry rig in conjunction with a variety of specific attachments. In one embodiment of the invention disclosed the attachment takes the form of a "minimum tillage" corn planter. A conventional tool bar type planter with a herbicide and insecticide unit is attached to the tool bar of the slurry rig. The carriage of the slurry rig is modified by attaching two additional wheels, four wheels in all, one for each unit. The wheels are added in sets of two on an independent pivoted axis. The wheel carriage is so designed that regardless of the irregularity of a field, a firm seed bed is prepared. Movement of the wheels on the pivot allows the individual wheels to follow the contour of the soil. The volume of air pressure in the tires can be readily varied to coordinate with the weight of the slurry fertilizer and the weight of applicator to exert the proper weight for the desired seed bed compaction.

A positive displacement metering pump driven from the packing wheel of the minimum tillage planter unit transfers the slurry fertilizer to the soil at a point a few inches to the side of and just above the placed seed. Amounts of slurry fertilizer placed in the soil are controlled by changing the ratio of revolutions between the packing wheel and the pump. When the planter unit is lifted from the seed bed, the whole operation, including planting seed, metering fertilizer, spreading insecticide, and spraying herbicides ceases.

According to another embodiment of the invention the attachment consists of a pair of power driven rotating slinging devices attached to the slurry rig which devices literally throw or sling the heavy viscous material in the form of discrete globules which settle in a uniform pattern. The slinger includes a mechanical device in the form of a spinner including a vertical tube having affixed to its lower end four short metal tubes at an angle of approximately 115° from an upward vertical direction. Attached to these tubes are four curved plastic tubes, the upper ends of which are enlarged sufficiently to slip over the metal tubes. The plastic tubes or pipes are held in place by adjustable clamps. The slinging devices are supported at the ends of a novel folding framework or boom wherein a portion of the supporting structure also serves as a conduit conveying the slurry from the slurry rig to the rotating heads of the spinners.

It is therefore one object of the present invention to provide a novel slurry applicator.

Another object of the present invention is to provide a versatile slurry rig for use in conjunction with the application of slurry fertilizers.

Another object of the present invention is to provide a novel combination slurry applicator and planter.

Another object of the present invention is to provide a novel slinger type slurry applicator.

Another object of the present invention is to provide a novel folding boom for slurry applicators.

Another object of the present invention is to provide a novel minimum tillage combination fertilizer applicator and planter.

Another object of the present invention is to provide a planting unit having automatic slurry proportioning and cut-off features.

Another object of the present invention is to provide a novel direct applicator for corn planters and the like.

These and further objects and advantages of the invention will be more apparent upon reference to the following specification, claims and appended drawings wherein:

FIGURE 1 shows the basic tractor-drawn slurry rig of the present invention pulling a corn planter;

FIGURE 2 is a side view of the combination slurry rig and corn planter of FIGURE 1;

FIGURE 3 is a side view similar to FIGURE 2 showing the planter in an elevated or raised position;

FIGURE 4 is a view with parts in section showing the interior of the slurry rig of FIGURES 1 through 3;

FIGURE 5 is a front view of the slurry rig of FIGURES 1 through 4;

FIGURE 6 is a cross section through the slurry and herbicide tank;

FIGURE 7 is a diagrammatic view showing the various elements of the unit and their sequence in acting upon the soil;

FIGURE 8 is a diagrammatic view illustrating the action of the fertilizer disc of FIGURE 7;

FIGURE 11 shows the slurry rig provided with foldable booms carrying a pair of slurry slingers or spinners;

FIGURE 12 is a plan view of the applicator of FIGURE 11 with the foldable position of the boom indicated by dashed lines; and FIGURE 13 is an enlarged view of one of the spinners of FIGURES 11 and 12.

Figure 9:
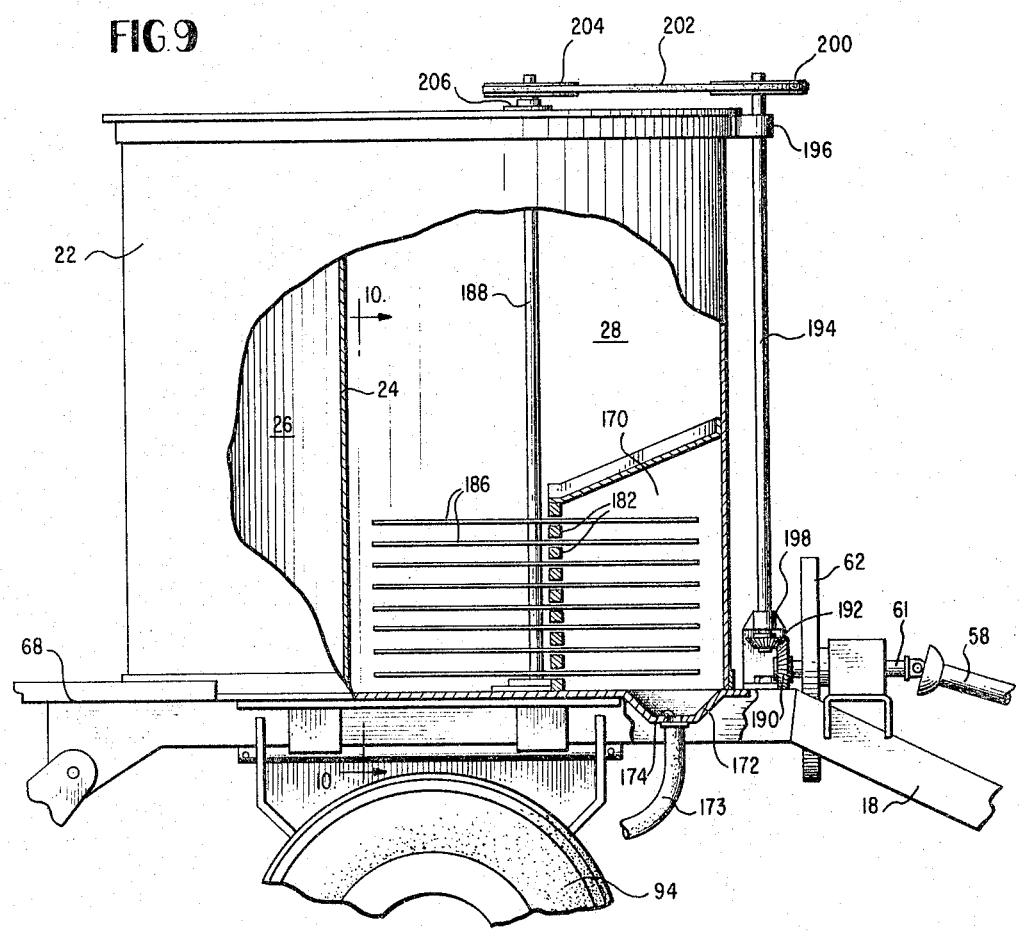
FIGURE 9 shows a modified slurry rig having a different drive and beater or mixer construction.

As the science of modern farming progresses, it has been found very beneficial to do as many operations with as few passes over the ground with farm equipment as can be arranged to accomplish the purpose of tilling the soil sufficiently for growing a crop. This new concept of modern farming involving a minimum compaction of the soil by farm vehicles is known as "minimum tillage." The ultimate to accomplish this purpose is to plant the seed at the time of plowing and this method is known as plow-plant.

The plow-plant method of farming is not too practical, particularly in view of the tendency toward larger acreages in any one farming operation. This is because of the fact that the plow-plant operation is a very slow one. At seeding time there are relatively few days when soil conditions permit planting. That is there are few days when the combination of soil, moisture and temperature are just right. As a result, the farmer usually finds it necessary to do each operation separately, plowing when the soil conditions permit plowing and planting the seed at the proper time. The practice in the past has been to plow the soil either in the fall of the year or at spring time. The plowed ground was then further prepared by two or three diskings before planting. The result of this type of operation was a very finely mulched soil on the surface with a packed lower soil caused by the heavy weight of the tractor running over it during the disking operations.

The finely mulched top soil is very subject to wind and water erosion. Packing of the under soil prevents the penetration of water, creates a condition where it is difficult for the plant roots to penetrate and retards aeration. This is a serious disadvantage since it has been learned that oxygen is one of the very important elements necessary to proper plant growth and aeration is the only means of a plant obtaining oxygen from the soil. The concept of minimum tillage resulting in minimum compaction of the soil avoids this disadvantage.

Referring to the drawings, there is illustrated at 10 in FIGURE 1 a combination slurry rig 12 and corn planter 14 adapted to be pulled by a tractor indicated in phantom 16. The slurry rig is drawn by suitable hitch bars 18 and 20 from the tractor and comprises a right circular cylindrical tank 22 provided with an interior partition 24 best seen in FIGURES 4 and 6 dividing the tank 22 into a herbicide compartment 26 partially filled with liquid herbicide, and a fertilizer compartment 28 illustrated in FIGURE 4 as partially filled with slurry fertilizer.

Within the fertilizer compartment 28 is a cone type agitator and beater 30 comprising angular bars 32 mounted on a horizontal shaft 34 which shaft is rotatably received in suitable bearings 36 and 38. Shaft 34 is rotated from a set of pulleys 40, 42 and 44 and 54 connected together by a pair of drive belts 46 and 48 as best seen in FIGURE 5. Pulley 44 drives a pump 50 mounted on channel support 51 and connected by a flexible line 52 to the top of the herbicide compartment 26. This pump serves to supply herbicide from this compartment to nozzles 124 as more fully discussed below. The pump pulley 44 is driven by means of belt 48 from drive pulley 54 coupled by universal connection 56 to a rod 58 having its other end similarly connected to the power take-off 60 of the tractor 16. The short shaft 61 on which pulley 54 is mounted also carries a fly wheel 62 positioned between this pulley and the smaller pulley 42. Drive is by way of shaft 61, pulley 42, belt 46 and pulley 40 to the mixer and beater shaft 34.

A pair of struts 64 and 66 help secure the tank 22 to a carriage bed 68. Each side of the carriage bed is provided with a pair of spaced downwardly extending rigid support blocks such as blocks 70 and 72 and carries channel 51 at its front end. Each pair of blocks supports one of the non-rotatable longitudinally extending axles 74 and 76. Pivoted to each of the axles by a cotter key at each end such as keys 78 and 80 in FIGURE 5 are wheel frames 82 and 84 having upwardly extending front kanges 86 and rear flanges 88. The axles 74 and 76 are rotatably received through these flanges and the wheel frames support transverse non-rotatable axles 90 and 92 on which are rotatably mounted the four wheels 94, 96, 98 and 100.

An important feature of the slurry rig is the pivoted mounting of the wheels which, as best seen in FIGURE 5 makes it possible for the wheels to adapt themselves to uneven terrain so as to maintain a more uniform distribution of weight between the four wheels of the slurry rig.

Additional features of the tank 22 include the transparent sight tubes 102 and 104 alongside of suitable indicia markings 106 and 108 for indicating the height respectively of the herbicide in compartment 26 and the fertilizer in compartment 28. Access to the fertilizer compartment is through a suitable manhole cover generally indicated at 110 at the top of the tank.

Behind the slurry rig 12 including tank 22 is the corn planter 14 comprising at its rearmost ends four soil engaging compacting wheels 112, 114, 116 and 118. These compacting wheels form a part of four individual planting units, each of which is independently supported by clamps such as 120 from a rectangular tool bar 122. Trailing behind each of the compacting wheels 112, 114, 116 and 118 is a herbicide nozzle 124, each connected by its own flexible fluid line 126 to a herbicide distributor 125 in turn coupled by a suitable flow line 127 to the pump 50 drawing herbicide from the compartment 26 of the tank 22. Herbicide nozzles 124 are supported from the individual frames 128 by a rearwardly and slightly upwardly extending U-shaped bracket 130.

Insecticide is applied in front of each of the compacting wheels from a pair of insecticide containers 130 and 132 each having a pair of outlet hoses 134 and 136. Seed is supplied to each of the four seed furrows from one of the four seed cans 138. Slurry is supplied through flexible lines 140 from the underside of tank 22 by way of four Mayno pumps 142.

The corn planter is provided with a marking disc 142 mounted on a foldable outrigger arm 144 which disc is used to mark the next row of corn. Also carried by each of the planter units is an adjustable seed knife 146 and a fertilizer disc 148. The depth of the seed knife which determines the depth of the seed beneath the soil may be adjusted by a suitable manually operated lever 150.

A suitable hydraulic piston and cylinder (not shown) is mounted on the middle rear portion of the slurry rig bed 68 and is supplied hydraulic fluid from the tractor by way of lines 147 and 149. It acts on linkage arms 151 to rotate the tool bar about pivots 153 from the position illustrated in FIGURE 2 to that illustrated in FIGURE 3 so as to lift the four corn planter units. Each of the Mayno pumps is belt driven from the compacting wheels so that with the unit in the raised position of FIGURE 3, the compacting wheels are no longer rotated by engagement with the ground 152 and the Mayno pumps immediately stop working, thus closing off the supply of fertilizer without requiring any separate valves other than the Mayno pumps themselves. As illustrated in FIGURE 1, similar chain drive mechanisms connect the compacting wheels to the insecticide containers 130 and 132 and also to the seed cans 138 so that these too are shut off when they are no longer chain driven from the compacting wheels. One such chain drive connection to the insecticide container 130 is illustrated at 154 in FIGURE 1 while the chain drive to the seed can 132 is illustrated at 156 in FIGURE 1 just behind the slurry rig wheel 94. Likewise a suitable valve mechanism 155 on the distributor 125 is provided for cutting off the herbicide supply to the herbicide nozzles 124 upon raising of the corn planter assembly to the position illustrated in FIGURE 3.

Referring to FIGURE 7, there is shown the sequence of operation on the soil 152 with the direction of motion indicated by the arrow 158. Wheel 100 makes a track 160 in the soil and this wheel is followed by a seed knife 146. Seed 162 from the trailing seed can 138 drops downwardly into the generally V-shaped furrow 164 left by the blade 146. A second furrow 166 is created alongside the seed furrow 164 by the fertilizer disc 148 and into this furrow is supplied the fertilizer from tube 134. Finally both the furrows are compacted by wheel 112 and the final spray of herbicide supplied from the nozzle 124.

A firm seed bed is very important for the germination of the seed and the planter of this invention provides this important operation at the point of seed placement while at the same time leaving the soil between the rows loose to receive moisture and oxygen aeration. The final compacting of the seed bed creates ideal soil conditions for the spraying of herbicides. The weed seed, the same as the crop seed, germinates very readily thereby giving the herbicide the opportunity to function effectively.

The slurry is pumped from the tank through the four positive displacement Mayno pumps and the fertilizer is deposited slightly to the side of the seed corn furrow, as best seen in FIGURES 7 and 8. The fertilizer disc 148 creating the furrow for the fertilizer, occupies the dashed line position in FIGURE 8 when the tool bar assemblage is raised but is drawn over into the solid line position by the edge of the track caused by compaction of the wheel 100. This results in a highly desirable position for depositing the fertilizer; that is right at the edge of the compacted area. The Mayno pumps are not only metering pumps driven by the rearmost compacting wheels but also act as valves. That is to say, when the unit stops, the Mayno pumps act as valves to stop the flow of fertilizer and therefore there is no necessity for additional valves. The conventional Mayno pumps being positive displacement type pumps can handle the heavy slurry fertilizer and tend to break up any crystals that might form.

One of the important features of the slurry rig 12 lies in the pivoting of the wheels as best illustrated in FIGURE 5. This insures that all the wheels will perform a substantially equal compaction function despite unevenness in terrain. The wheels are preferably wide wheels and the load per wheel may vary between 300 to 1,000 pounds, the lower limit being with the tank 22 empty and the upper limit being with the tank full. This variation in weight is highly desirable in order to permit breaking up dry clods of earth and in providing adequate compaction of the dry earth. With prior devices the normal range was 300 to 400 pounds per wheel in a commercially available unit. In such a unit, however, the weight was simple dead weight (iron) performing no useful function. In the present unit the weight is provided in the form of fertilizer. Where it is desired to keep the load per wheel high the farmer can simply keep refilling the tank without letting it get to too low a level. The unit provides minimum tillage which is recognized as desirable in farms today. That is, it has been recognized that it is now desirable to compact the earth only to the extent necessary for planting and that it is not desirable to compact the entire acreage being planted. The present invention provides controlled compaction without unnecessarily compacting areas between rows which are not being planted. The degree of compaction cannot only be controlled by the amount of fertilizer maintained in the tank, but also by adjusting the pressure in the tires. Since the rate of travel is quite slow, it is feasible to use air pressure of between five to forty-five p.s.i.g.

Figure 10:
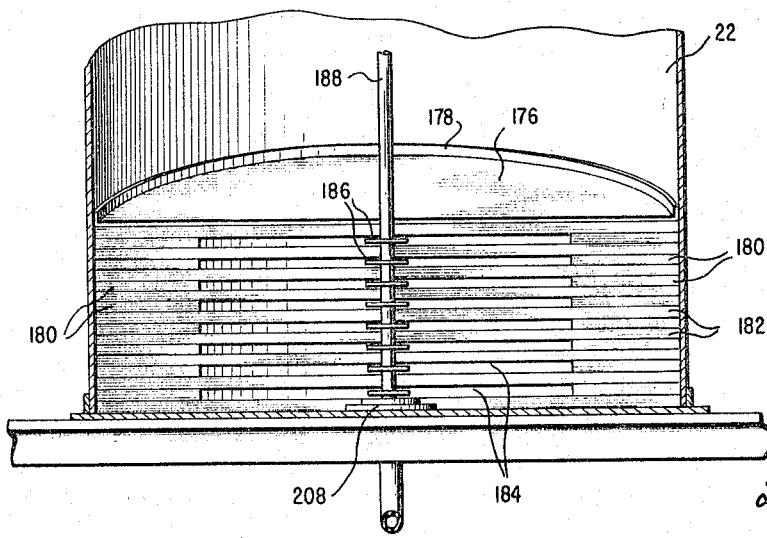
FIGURE 10 is a partial cross section taken at right angles to that of FIGURE 9.

Referring to FIGURES 9 and 10, there is shown a slurry rig having a modified agitator and beater for minimizing the growth of large crystals in the slurry. The tank 22 is again provided with inner partition 24 dividing the tank into a herbicide compartment 26 and a slurry compartment 28. However, the slurry compartment 28 is itself provided with a separate small compartment 170 adjacent the outlet cone 172 suitably apertured as at 174 so as to provide a gravity feed to the flexible outlet tube 173. Outlet compartment 170 is defined by the side walls of the tank and by a slanted semi-circular top plate 176 provided with an upwardly extending flange 178 welded or otherwise suitably secured to the inner walls of the tank.

The remaining wall of the outlet compartment 170 is formed by alternate short iron bars 180 and long iron bars 182 defining spaced elongated slots 184. Adapted to be rotated through the slots 184 are the ends of a plurality of rectangular rods 186 attached to and rotatable with a vertical drive shaft 188 rotatably mounted within the fertilizer compartment. As the slurry gains access through the slots 184 to the outlet compartment 170, any large crystals are broken up by the ends of the bars 186 as they rotate through these slots.

Short shaft 61 carrying fly wheel 62 is in this case provided at its end with a bevel gear 190 meshing with a similar bevel gear 192 on the end of vertical shaft 194. The ends of shaft 194 are supported in bearings 196 and 198 and its upper end carries a pulley 200 receiving a drive belt 202 also reeved around a pulley 204 on the end of agitator shaft 188. Agitator shaft 188 is supported at its ends by bearings 206 and 208. Drive for the modified agitator is therefore from the tractor power take off through rod 58, shaft 61, shaft 194 and belt 202 to the rotatable rod-carrying shaft 188.

FIGURES 11, 12 and 13 show a modified applicator construction wherein the slurry rig is combined with a pair of slingers or spinners for broadcasting the slurry over the soil traversed by the rig. In this embodiment the slurry rig 12 is again constructed to be drawn by a tractor such as tractor 16 of FIGURE 1. As best seen in FIGURE 13 the spinners 209 and 211 comprise four downwardly and outwardly extending curved plastic tubes 208 connected by clamps 210 to four very short tubes 212 spaced 90 degrees apart about the vertical axis of rotation of the spinner and extending downwardly from the horizontal at an angle of approximately 25 degrees. These latter tubes 212 are connected to a rotatable vertical tube 214 rotatably received through a bearing housing 216. Central hollow vertical tube 214 carries a pulley 218 around which is reeved a drive belt 220. The upper end of tube 214 is attached through rotatable coupling 222 to a stationary pipe 228. The details of the mounting of the spinner heads for rotation are more fully set forth and disclosed in copending applications Serial No. 210,720 filed July 18, 1962 and 282,729 filed May 23, 1963, now abandoned.

Each of the spinners 209 and 211 is mounted on the end of a pair of booms 224 and 226, movable from the solid to the dashed line positions illustrated in FIGURE 12. Each of the booms is provided with an upper hollow pipe 228 which supplies fertilizer to the spinners, a lower support arm 230 and a plurality of vertical struts 232. Belts 220 and 221 are reeved around a suitable double pulley 234 to drive the spinners.

The supply pipes 228 and the support arms 230 are both provided with rigidly attached brackets 236 and 238 having downwardly extending pins pivotally received through suitable apertures in the projecting ends of a support frame generally indicated at 240 secured to the rear of the slurry rig. This arrangement makes it possible for the booms and spinners to be pivoted about the axes 242 and 244 in FIGURE 12 from the solid to the dashed line positions once the pulley belts have been disengaged from the spinners.

Supply of slurry fertilizer to the spinners is from the underside of the tank 22 by way of the flexible hose 245 through the combination pump and distributor 238 mounted on the rear of the tank 22. The slurry passes outwardly from the distributor portion of the pump 238 by way of a pair of flexible lines 241 and 243 to horizontal pipes 247 secured to the frame 240. The ends of these pipes rotatably receive vertical stand pipes 246 and through these communicate for the flow of fertilizer with the ends of the boom pipes 228. Thus, slurry fertilizer is fed from the distributor pump 239 through flexible leads 241 and 242, rigid pipes 244, through the rotatable couplings 247 to the stand pipes 246, through the boom pipes 228 and through the rotatable vertical tubes 214 to the plastic discharge pipes 208.

Drive for the spinners is by way of the tractor power take-off rod 58 and a suitable vertical drive belt to a rotating horizontal shaft 250 supported at each end by bearings 252 and 254 on the top of the tank 22. One end of the shaft 250 carries a pulley 256 belt driven from the stub shaft 61 while the other end of the horizontal shaft 250 carries a second pulley 258 having a belt 260 driving a gear 262. Gear 262 meshes with a crown gear 264 on the upper end of a shaft 266 mounted on suitable bearings in the frame 240 and carrying at its other end the double pulley 234 around which are reeved the ends of the drive belts 220 and 221 for the spinners.

It is apparent from the above that the present invention provides a novel, versatile, slurry rig which may be used with a wide variety of attachments for distributing fertilizer. Important features of the slurry rig include the provisions for both herbicide and slurry compartments, a novel beating and agitating drive system for maintaining the slurry in suspended condition while at the same time breaking up any large crystals which may materialize in the slurry, and also a novel pivotal arrangement which in conjunction with the weight of the liquid and slurry in the rig permit an increased and more even distribution of weight to the compacting tires. When used in conjunction with the corn planter shown and described, the unit provides for optimum minimum tillage recently recognized as highly desirable in modern farming operations. When used in conjunction with slinger or spinner type distributor apparatus, the slurry rig is particularly suited for tractor drawn equipment with a collapsible boom which may be folded to provide operation with a minimum of clearance. The pivoting of the wheels assures that each will perform a substantially equal compaction and in conjunction with the weight of the liquid and slurry in the rig make possible a load per wheel variation of between 300 to 1,000 pounds as compared with the dead weight of 300 to 400 pounds formerly available. Thus, the degree of compaction can not only be accurately controlled by the amount of the fertilizer in the tank but also by adjusting the pressure in the tires, and since the rate of travel is quite slow, air pressures of as low as 5 pounds p.s.i.g. up to 45 pounds p.s.i.g. may be utilized.

The novel mixer and beater of FIGURES 8 and 9 provides a shear cutter type of mixer and agitator which is capable of breaking up large crystals. The vertical nature of the mixer makes it possible to eliminate the necessity for bearing seals and the intermeshing members may be simply constructed from bar stock steel rather than angle iron.

In the spinner distributor of FIGURES 11 through 13, the point of pivot of the booms is advantageously outboard of the slurry tank, thus completely eliminating any tendency of the booms to vibrate and flop around when in use. Also the boom structure is formed partly as pipes with these pipes carrying the slurry fertilizer to the spinner heads.

Having described this invention we claim:

1. A slurry rig for applying slurry fertilizer to soil comprising a tank having a slurry compartment and an outlet compartment adjacent the bottom of said tank, an outlet aperture in said outlet compartment, a vertical wall between said slurry compartment and said outlet compartment having a plurality of elongated slots therein providing access for the flow of slurry between said compartments, and crystal breaking means intermittently movable through said slots to break up large crystals that may form in said tank.

2. A rig according to claim 1 wherein said crystal breaking means comprises a plurality of spaced bars mounted on a rotatable shaft.

3. A slurry rig for applying slurry fertilizers to soil comprising a tank having a slurry compartment and an outlet compartment adjacent the bottom of said tank, an outlet aperture in said outlet compartment, a vertical wall between said slurry compartment and said outlet compartment having a plurality of elongated horizontal slots therein providing fluid communication for the flow of viscous slurry from said slurry compartment to said outlet compartment, a vertical shaft rotatably mounted in said slurry compartment adjacent said vertical wall, and a plurality of metal bars mounted on said shaft and positioned to have the outer portions thereof pass into and out of said slots during rotation of said shaft.

4. A slurry rig for applying a slurry fertilizer to soil and for forming a plurality of substantially equally compacted tracks for planting and receipt of said fertilizer, said slurry rig comprising a tank for holding slurry adapted to be drawn by a motor vehicle over the soil, an agitator in said tank for breaking up large crystals that may form, a bed supporting said tank and including a pair of pivot axles extending parallel to the direction of travel of said tank over the soil, wheel frames pivoted to each of said axles, and a pair of wheels rotatably mounted on each of said wheel frames, slurry fertilizer distributing means disposed in line with said tracks formed by said wheels, and means for delivering slurry fertilizer from said tank to said distributing means so as to deposit slurry fertilizer in the tracks compacted by said wheels.

5. A slurry rig as set out in claim 4, wherein each said pair of wheels is rotatably mounted on its wheel frame on axles rigidly carried by the wheel frames.

6. A slurry rig as set out in claim 4, wherein said wheels are provided with flotation tires operable with a tire pressure as low as five pounds per square inch gauge.

7. A slurry rig as set out in claim 4, wherein said agitator is disposed adjacent and at least partially overlying the point at which slurry fertilizer is removed from said tank.

References Cited by the Examiner

UNITED STATES PATENTS

| | | | |
|---|---|---|---|
| 1,588,842 | 6/1926 | Knox | 280—81 |
| 2,919,054 | 12/1959 | Waller | 222—178 |
| 2,945,698 | 7/1960 | Kaller | 222—178 |
| 3,036,842 | 5/1962 | Elliott et al. | 280—81 |
| 3,136,485 | 6/1964 | Bellows et al. | 222—178 |
| 3,140,879 | 7/1964 | Schaefer | 280—81 |

ROBERT B. REEVES, *Primary Examiner.*

HADD S. LANE, *Examiner.*